US009759995B2

United States Patent
Kirmani et al.

(10) Patent No.: US 9,759,995 B2
(45) Date of Patent: Sep. 12, 2017

(54) SYSTEM AND METHOD FOR DIFFUSE IMAGING WITH TIME-VARYING ILLUMINATION INTENSITY

(75) Inventors: Ghulam Ahmed Kirmani, Cambridge, MA (US); Vivek K. Goyal, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 786 days.

(21) Appl. No.: 13/572,768

(22) Filed: Aug. 13, 2012

(65) Prior Publication Data

US 2013/0044213 A1     Feb. 21, 2013

Related U.S. Application Data

(60) Provisional application No. 61/524,795, filed on Aug. 18, 2011.

(51) Int. Cl.
    *G03B 39/00*      (2006.01)
    *G06T 5/50*      (2006.01)
    (Continued)

(52) U.S. Cl.
CPC ............ *G03B 39/00* (2013.01); *G01J 1/0437* (2013.01); *G01J 1/08* (2013.01); *G01J 1/4228* (2013.01);
(Continued)

(58) Field of Classification Search
CPC ...... G03B 39/00; G03B 39/005; G01B 11/25; H04N 5/783
See application file for complete search history.

(56) References Cited

U.S. PATENT DOCUMENTS

| 4,796,997 A * | 1/1989 | Svetkoff ................ G01B 11/24 356/4.06 |
| 2006/0227317 A1 | 10/2006 | Henderson |

(Continued)

FOREIGN PATENT DOCUMENTS

| DE | 2005/028570 A1 | 12/2006 |
| DE | 2008/021465 A1 | 11/2009 |
| WO | 94/20301 A1 | 9/1994 |

OTHER PUBLICATIONS

Tom Harris, "How Camcorders Work" Oct. 10, 2000, HowStuffWorks.com, <http://electronics.howstuffworks.com/camcorder.htm>.*

(Continued)

*Primary Examiner* — David N Werner
(74) *Attorney, Agent, or Firm* — Sam Pasternack; MIT Technology Licensing Office (57) ABSTRACT

Diffuse image measurement system and digital image formation method. The system includes a source of light with time-varying intensity directed at a scene to be imaged. A time-resolved light meter is provided for receiving light reflected from the scene to generate time-resolved samples of the intensity of light incident at the light meter. The temporal variation in the intensity of light incident at the light meter is associated with a function of a radiometric property of the scene, such as a linear functional of reflectance, and a computer processes the samples to construct a digital image. The spatial resolution of the digital image is finer than the spatial support of the illumination on the scene and finer than the spatial support of the sensitivity of the light meter. Using appropriate light sources instead of impulsive illumination significantly improves signal-to-noise ratio and reconstruction quality.

8 Claims, 4 Drawing Sheets

(51) Int. Cl.
  G01J 1/04 (2006.01)
  G01J 1/08 (2006.01)
  G01J 1/42 (2006.01)
(52) U.S. Cl.
  CPC .............. *G03B 39/005* (2013.01); *G06T 5/50* (2013.01); *G06T 2207/10152* (2013.01); *G06T 2207/20221* (2013.01)

(56) References Cited

U.S. PATENT DOCUMENTS

| | | |
|---|---|---|
| 2006/0239336 A1 | 10/2006 | Baraniuk |
| 2008/0174658 A1* | 7/2008 | Santus .................. G03B 39/00 348/47 |
| 2010/0278521 A1* | 11/2010 | Sandler .................. B64G 3/00 396/155 |
| 2012/0075423 A1 | 3/2012 | Kirmani |
| 2012/0105664 A1* | 5/2012 | Kang ................. G01N 21/8851 348/222.1 |

OTHER PUBLICATIONS

A. McCarthy, R.J. Collins, N.J. Krichel, V. Fernandez, A.M. Wallace, & G.S. Butler, "Long-range time-of-flight scanning sensor based on high-speed time-correlated single-photon counting", 48 Applied Optics 6241-6251 (2009).*

Z.J. Geng, "Rainbow three-dimensional camera: new concept of high-speed three-dimensional vision systems", 35 Opt. Eng. 376-383 (Feb. 1996).*

International Search Report and Written Opinion Issued in Connection with International Patent Application No. PCT/US2012/050746 mailed on Feb. 6, 2013.

Invitation to Pay Additional Fees for PCT/US2012/050748 mailed on Feb. 6, 2013.

Ahmed Kirmani, Andreas Velten, Tyler Hutchison, M. Everett Lawson, Vivek K Goyal, Moungi G Bawendi, Ramesh Raskar, "Reconstructing an Image on a Hidden Plane using Ultrafast Imaging of Diffuse Reflections," (2011).

Brent Schwarz, "LIDAR: Mapping the world in 3D," Nature Photonics, vol. 4, No. 7, pp. 429-430, Jul. 2010.

Sergi Foix, Guillem Alenya, Carme Torras, "Lock-in-time-of-flight (ToF) cameras: A survey," IEEE Sensors J., vol. 11, No. 9, pp. 1917-1926, Sep. 2011.

Pradeep Sen, Billy Chen, Gaurav Garg, Stephen R. Marschner, Mark Horowitz, Marc LeVoy, Hendrik P. A. Lensch, "Dual photography," ACM Trans. Graphics, vol. 24, No. 3, pp. 745-755, Jul. 2005.

Ahmed Kirmani, Tyler Hutchison, James Davis, Ramesh Raskar, "Looking around the corner using transient imaging," in Proc. IEEE 12th Int. Conf. on Computer Vision, Kyoto, Japan, Sep.-Oct. 2009.

Michael Oren, Shree K. Nayar, "Generalization of the Lambertian model and implications for machine vision," Int. J. Comput. Vis., vol. 14, No. 3, pp. 227-251, Apr. 1995.

Michael Unser, "Sampling—50 years after Shannon," Proc. IEEE, vol. 86, No. 4, pp. 569-587, Apr. 2000.

Michael Elad, Arie Feuer, "Restoration of a single superresolution image from several blurred, noisy and undersampled measured images," IEEE Trans. Image Process., vol. 6, No. 12, pp. 1646-1656, Dec. 1997.

Pradeep Sen, Soheil Darabi, "Compressive dual photography," Computer Graphics Forum, vol. 28, No. 2, pp. 609-618, Apr. 2009.

Pawan K. Baheti and Mark A. Neifeld, "Feature-specific structured imaging," Applied Optics, vol. 45, No. 26, pp. 7382-7391, Oct. 2006.

Dharmpal Takhar, Jason N. Laska, Michael B. Wakin, Marco F. Duarte, Dror Baron Shriram Sarvotham, Kevin F. Kelly, Richard G. Baraniuk, "A new compressive imaging camera architecture using optical-domain compression," in Computational Imaging IV, C. A. Bouman, E. L. Miller, and I. Pollak, eds., Proc. SPIE vol. 6065, 2006.

Baris I. Erkmen, Jeffrey H. Shapiro, "Ghost imaging: from quantum to classical to computational," Advances in Optics and Photonics, vol. 2, No. 4, pp. 405-450.

Jonathan D. Coker, Ahmed H. Tewfik, "Multistatic SAR image reconstruction based on an elliptical-geometry Radon transform," in International Waveform Diversity and Design Conference 2007, pp. 204-208.

Rim Gouia, "Some problems of integral geometry in advanced imaging," doctoral dissertation, University of Texas-Arlington, 2011.

Rim Gouia-Zarrad, Gaik Ambartsoumian, "Approximate inversion algorithm of the elliptical Radon transform," in 8th International Symposium on Mechatronics and Its Applications, pp. 1-4, 2012.

Sergi Foix, Guillem Alenya, Carme Torras, "Lock-in Time of Flight (ToF) Cameras: A Survey," IEEE Sensors J., vol. 11, No. 9, pp. 1917-1926, Sep. 2011.

Pradeep Sen, Billy Chen, Gaurav Garg, Stephen R. Marschner, Mark Horowitz, Marc LeVoy, Hendrik P. A. Lensch, "Dual Photography," ACM Trans Graphics, vol. 24, No. 3, pp. 745-756, Jul. 2006.

* cited by examiner

Block diagram abstraction for signal sampled at Sensor κ.

SYSTEM AND METHOD FOR DIFFUSE IMAGING WITH TIME-VARYING ILLUMINATION INTENSITY

This application claims priority to provisional application No. 61/524,795 filed on Aug. 18, 2011, the contents of which are incorporated herein by reference.

This invention was made with government support under Grant No. CCF-0643836 awarded by the National Science Foundation. The government has certain rights in this invention.

BACKGROUND OF THE INVENTION

This invention relates to forming images with light, where the image is determined computationally from time-resolved measurements. The spatial resolution of the computed image is finer than the spatial support of the illuminations and finer than the spatial support of the sensitivities of the light meters. In an embodiment representing a limiting case, images are formed with a single illumination extending across the entire scene and each light meter sensitive to the entire scene.

Imaging is distinguished from other forms of sensing by having the goal of producing an image—a representation in one-to-one spatial correspondence with an object or scene. An image could appear on a continuous substrate such as film or paper and thus require uncountably-many numbers to be described. This invention relates instead to digital images—images described by finitely-many entries, where each entry is finitely-many numbers in discrete or continuous sets. The spatial correspondence of a digital image relates an entry in a digital image to a point, line, patch, or volume in the scene. Lines, patches, or volumes may overlap. Each entry in a digital image can represent brightness, reflectance, or other radiometric properties of a scene known to those of skill in the art. An entry in a digital image comprising a plurality of values may represent radiometric properties distinguished by wavelength or other distinctions known to those of skill in the art.

Traditional imaging involves illumination of the scene with a light source whose intensity does not vary appreciably with time. For example, the reflectance pattern on scene surfaces is acquired by using a lens to focus the incident light onto a plurality of light meters. Those of skill in the art will recognize that light meter can refer to any method of measuring light intensity, including but not limited to chemical and electronic methods, such as a PIN photodiode. Each light meter is sensitive to light originating at some subset of the scene, possibly with some variation of sensitivity with spatial location. The light meters are often in a regular two-dimensional (2D) array, but those skilled in the art will recognize that other arrangements of light meters are possible. Each light meter measures light intensity without time resolution. This means that while each light meter may have a sensitivity to incident light that varies with time—for example, using a shutter or any other method known to those skilled in the art—the light meter produces a single measurement, so variation of the incident light intensity with time cannot be inferred. Each entry of the digital image corresponds to one light meter. The number of light meters equals the number of pixels of the digital image; the number of pixels is also called the size of the digital image.

Many methods of imaging that use light sources and light meters in non-traditional ways are known to those skilled in the art. For example, dual photography [5] uses directed illumination and a single light meter. By Helmholtz reciprocity, directing light at one scene point, line, patch, or volume and measuring at one light meter is approximately equivalent to illuminating the entire scene and focusing reflected light only from the one scene point, line, patch, or volume on a light meter. Thus, by directing the illumination at a plurality of scene points, lines, patches, or volumes, one at a time, the effect of using a plurality of light meters is simulated. The number of distinct illumination points, lines, patches, or volumes equals the size of the digital image. Compressive dual photography [10], structured illumination [11], patterned light collection [12], and computational ghost imaging [13] methods are variations on traditional or dual photography that use simultaneous illumination of and measurement of incident light from a plurality of scene points, lines, patches, or volumes. Digital images are formed through computational means with spatial resolution that is not finer than the smaller of the spatial support of the illumination and the spatial support of the sensitivity of the light meters. These methods do not use time-resolved measurement by the light meters.

The use of time-resolved measurement by light meters, especially very high-speed sensing in photography, is associated with effectively stopping motion [2]. An alternative is to exploit the finite speed of light to associate travel time of light with distances. This is achieved in time-of-flight range measurement systems [3,4], which map time shifts in intensity-modulated light signals to distances. These systems and a generalization that employs multiply-reflected light [6] do not infer properties other than distances, such as brightness or reflectance.

A method is known in which a digital image of a surface not in the line of sight of the illumination source or light meters is produced with light reflected from an approximately Lambertian reflector surface that is in the line of sight of the illumination source, the surface to be imaged, and a set of light meters [1]. The reflector surface is illuminated with very short impulses of light using a 50-femtosecond Ti:Sapphire laser operating at 75 MHz and with a wavelength of 798 nm. Light that scatters from the reflector to the surface to be imaged, back to the reflector and then to a set of light meters that are optically focused on the reflector are measured with very fine time resolution of 20 picoseconds using a streak camera. Measurements that are obtained with six illumination target points chosen on the reflector are computationally processed to obtain 50-by-50 pixel digital images. This prior art is limited by the use of very short pulses of light (approximately 50 femtoseconds) since fast variation of illumination intensity is more difficult to achieve than slower variation. Furthermore, it is limited by the use of indirect illumination and assumptions of omnidirectional reflections from the reflector surface.

SUMMARY OF THE INVENTION

The present invention overcomes the aforementioned drawbacks of previous imaging systems and methods by generating a digital image with spatial resolution finer than the smaller of the spatial support of the illumination intensity characteristic and the spatial support of the light meter sensitivity characteristic using light directed at a scene to be imaged that has time-varying intensity. In a preferred embodiment of the invention, a plurality of time-resolved light meters is provided for receiving light reflected from the scene to generate time-resolved samples of the intensity of light incident at each light meter; systems and methods involving only one light meter are also described. The temporal variation in the intensity of light incident at each sensor is related to radiometric properties of the scene, and a computer means processes the discrete-time samples to form a digital image. For any fixed desired image accuracy, suitable illumination bandwidth, sampling frequency, number of illumination spatial intensity characteristics, number of light meter spatial sensitivity characteristics, spatial extent of the light meters, distance between imaging device and scene, and image size scale together. In one example, 16 light meters in a regular array of size 4 m by 4 m provide a sharp 50 pixel by 50 pixel image of a scene 10 m from the imaging device with illumination bandwidth approximately 375 MHz and sampling frequency approximately 750 MHz. Those skilled in the art will recognize that many other combinations of parameters may be used. This opens up possibilities for forming digital images without lenses and mirrors and enables practical implementations of the imaging of occluded scenes. Need for a plurality of light meters can be removed by moving a single light meter to multiple locations or using a plurality of illuminations with differing spatial intensity characteristics. Such a plurality of illuminations could be produced with a plurality of light sources or a plurality of configurations of light sources and optical devices such as mirrors, lenses, and spatial light modulators.

As in a time-of-flight range measurement system, the present invention exploits that the speed of light is finite. Differences in optical path lengths combined with temporal variation of illumination give intensity variations with both space and time in the light emitted by the scene. The generation of a digital image is achieved through an unmixing of the radiometric information that is combined at each light meter because distinct optical paths may have equal path length.

DESCRIPTION OF THE PREFERRED EMBODIMENT

The invention is described through one exemplary configuration. Those skilled in the art can generate many other configurations.

Figure 1:
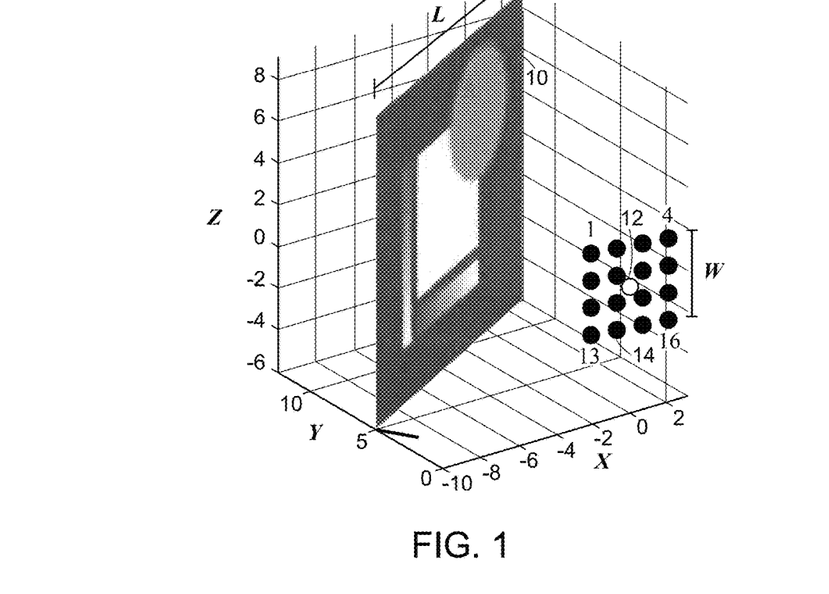
FIG. 1 is a perspective view of a scene with an omnidirectional light source that illuminates the scene and a 4-by-4 array of light meters for measuring the reflected light.

Consider the imaging scenario depicted in FIG. 1, with a planar surface 10 to be imaged, a single, time-varying, monochromatic, omnidirectional illumination source 12, and omnidirectional time-resolved light meters 14 indexed by $k \in \{1, 2, \ldots, K\}$. Those skilled in the art can modify the method described herein to include spatial variation of the illumination intensity, termed an illumination spatial intensity characteristic, and/or spatial variation of the sensing efficiency. Those skilled in the art can generate variations in spatial intensity characteristics and/or sensing efficiency through the use of spatial light modulators including, but not limited to, those based on liquid crystals and digital micromirror devices.

We assume that the position, orientation, and dimensions (L-by-L) of the planar surface 10 are known. Many methods for estimating these geometric parameters are known to those skilled in the art; a method using diffuse illumination and time-resolved sensing was recently demonstrated [6].

Formation of an ideal gray scale image is the recovery of the reflectance pattern on the surface, which can be modeled as a 2D function $f:[0,L]^2 \to [0,1]$. Those skilled in the art can replace the gray scale reflectance with other radiometric scene properties, including but not limited to a set of 2D functions representing reflectance at various wavelengths. We assume the surface to be Lambertian so that its perceived brightness is invariant to the angle of observation [7]; those skilled in the art may incorporate any bidirectional reflectance distribution function (BRDF), including but not limited to the Phong model, the Blinn-Phong model, the Torrance-Sparrow model, the Cook-Torrance model, the Oren-Nayar model, the Ashikhmin-Shirley model, the He-Torrance-Sillion-Greenberg model, the Lebedev model, the fitted Lafortune model, or Ward's anisotropic model.

Figure 2A:
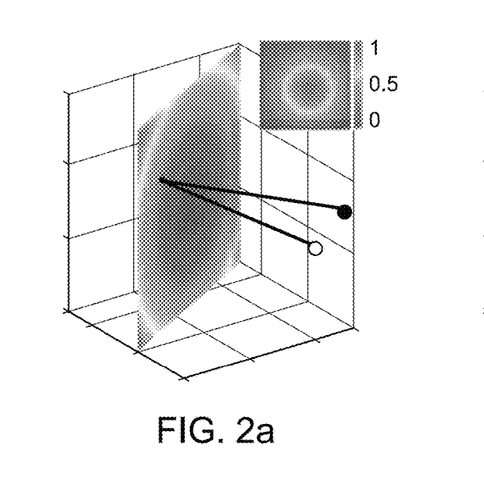
FIGS. 2a and 2b are plots illustrating that time delay from source to scene to light meter is a continuous function of the position in the scene.
Figure 2B:
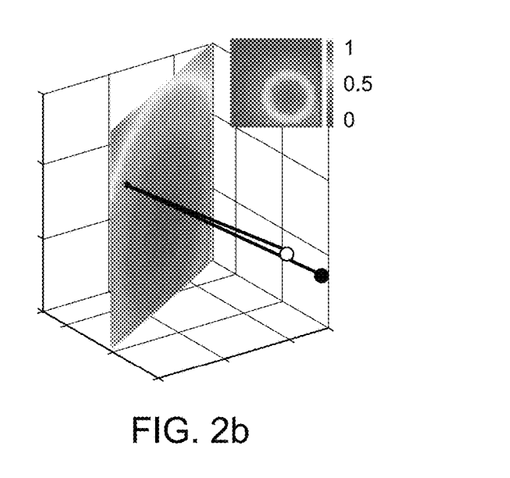

The light incident at Light Meter k is a combination of the time-delayed reflections from all points on the planar surface. For any point $x=(x_1,x_2) \in [0,L]^2$, let $d^{(1)}(x)$ denote the distance from illumination source to x, and let $d_k^{(2)}(x)$ denote the distance from x to Light Meter k. Then $d_k(x)=d^{(1)}(x)+d_k^{(2)}(x)$ is the total distance traveled by the contribution from x. This contribution is attenuated by the reflectance $f(x)$, square-law radial fall-off, and $\cos(\theta(x))$ to account for foreshortening of the surface with respect to the illumination, where $\theta(x)$ is the angle between the surface normal at x and a vector from x to the illumination source. Thus, when the intensity of the omnidirectional illumination is abstracted as a unit impulse at time 0, denoted $s(t)=\delta(t)$, the contribution from point x is the light intensity signal $a_k(x)f(x)\delta(t-d_k(x))$, where we have normalized to unit speed of light and $$a_k(x) = \frac{\cos(\theta(x))}{(d^{(1)}(x)d_k^{(2)}(x))^2} \quad (1)$$

is the light meter spatial sensitivity characteristic for Light Meter k. Examples of distance functions and light meter spatial sensitivity characteristics are shown in FIG. 2. Those skilled in the art can introduce additional factors including but not limited to a non-constant illumination spatial intensity characteristic, other contributors to a light meter spatial sensitivity characteristic, and the effect of a non-Lambertian BRDF.

Combining contributions over the plane, the total light incident at Light Meter k is $$g_k(t) = \int_0^L \int_0^L a_k(x)f(x)\delta(t-d_k(x))dx_1 dx_2. \quad (2)$$

Thus, evaluating $g_k(t)$ at a fixed time t amounts to integrating over $x \in [0,L]^2$ with $d_k(x)=t$. Define the isochronal curve $C_k^t = \{x : d_k(x)=t\}$. Then $$g_k(t) = \int a_k(x(k,u))f(x(k,u))du \quad (3)$$

where $x(k,u)$ is a parameterization of $C_k^t \cap [0,L]^2$ with unit speed. The intensity $g_k(t)$ thus contains the contour integrals over $C_k^t$'s of the desired function $f$. Each $C_k^t$ is a level curve of $d_k(x)$; as illustrated in FIG. 2, these are ellipses.

A digital system can use only samples of $g_k(t)$ rather than the continuous-time function itself. We now see how uniform sampling of $g_k(t)$ with a linear time-invariant (LTI) prefilter relates to linear functional measurements of $f$. This establishes the foundations of a Hilbert space view of diffuse imaging. Those skilled in the art can incorporate effects of non-LTI device characteristics.

Suppose discrete samples are obtained at Light Meter k with sampling prefilter $h_k(t)$ and sampling interval $T_k$:

$$y_k[n] = (g_k(t)*h_k(t))|_{t=nT_k}, \; n=1,2,\ldots,N. \quad (4)$$

A sample $y_k[n]$ can be seen as a standard $L^2(\mathbb{R})$ inner product between $g_k$ and a time-reversed and shifted $h_k$ [8]:

$$y_k[n] = \langle g_k(t), h_k(nT_k-t)\rangle. \quad (5)$$

Using (2), we can express (5) in terms of $f$ using the standard $L^2([0,L]^2)$ inner product:

$$y_k[n] = \langle f, \phi_{k,n}\rangle \text{ where} \quad (6a)$$

$$\phi_{k,n}(x) = a_k(x)h_k(nT_k - d_k(x)). \quad (6b)$$

Over a set of sensors and sample times, $\{\phi_{k,n}\}$ will span a subspace of $L^2([0,L]^2)$, and a sensible goal is to form a good approximation of $f$ in that subspace.

Figure 3A:
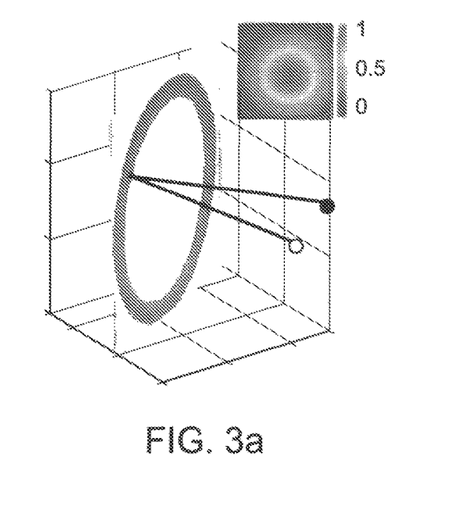
FIGS. 3a and 3b are plots showing a single measurement function according to an embodiment of the invention herein.
Figure 3B:
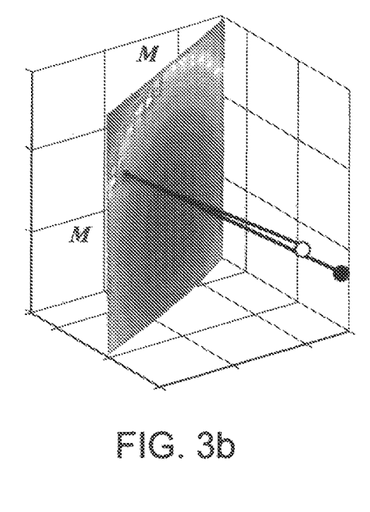

For ease of illustration and interpretation, let $T_k = T$, meaning all light meters have the same time resolution, and $$h_k(t) = h(t) = \begin{cases} 1, & \text{for } 0 \leq t \leq T; \\ 0, & \text{otherwise} \end{cases} \quad (7)$$

for all k, which corresponds to "integrate and dump" sampling. Now since $h_k(t)$ is nonzero only for $t \in [0,T]$, by (4) or (5), the sample $y_k[n]$ is the integral of $g_k(t)$ over $t \in [(n-1)T, nT]$. Thus, by (3), $y_k[n]$ is an a-weighted integral of $f$ between the contours $C_k^{(n-1)T}$ and $C_k^{nT}$. To interpret this as an inner product with $f$ as in (5), we see that $\phi_{k,n}(x)$ is $a_k(x)$ between $C_k^{(n-1)T}$ and $C_k^{nT}$ and zero otherwise. FIG. 3(a) shows a single representative $\phi_{k,n}$. The functions $\{\phi_{k,n}\}_{n \in \mathbb{Z}}$ for a single light meter have disjoint supports because of (7); their partitioning of the domain $[0,L]^2$ is illustrated in FIG. 3(b).

To express an estimate $\hat{f}$ of the reflectance $f$, it is convenient to fix an orthonormal basis for a subspace of $L^2([0,L]^2)$ and estimate the expansion coefficients in that basis. For an M-by-M pixel representation, let $$\psi_{i,j}(x) = \begin{cases} M/L, & \text{for } (i-1)L/M \leq x_1 < iL/M, \\ & (j-1)L/M \leq x_2 < jL/M; \\ 0, & \text{otherwise} \end{cases} \quad (8)$$

so that $\hat{f} = \sum_{i=1}^{M}\sum_{j=1}^{M} c_{i,j}\psi_{i,j}$ in the span of $\{\psi_{i,j}\}$ is constant on $\Delta$-by-$\Delta$ patches, where $\Delta = L/M$. Those skilled in the art can generalize the reconstruction space to other finite-dimensional manifolds in $L^2([0,L]^2)$.

For $\hat{f}$ to be consistent with the value measured by Sensor k at time n, we must have $$y_k[n] = \langle \hat{f}, \phi_{k,n}\rangle = \sum_{i=1}^{M}\sum_{j=1}^{M} c_{i,j}\langle \psi_{i,j}, \phi_{k,n}\rangle. \quad (9)$$

Note that the inner products $\{\langle \psi_{i,j}, \phi_{k,n}\rangle\}$ exclusively depend on $\Delta$, the positions of illumination and sensors, the plane geometry, the sampling prefilters $\{h_k\}_{k=1}^{K}$, and the sampling intervals $\{T_k\}_{k=1}^{K}$—not on the unknown reflectance of interest $f$. Hence, we have a system of linear equations to solve for the coefficients $\{c_{i,j}\}$. (In the case of basis (8), the coefficients are the pixel values multiplied by $\Delta$.)

When we specialize to the box sensor impulse response (7) and basis (8), many inner products $\langle \psi_{i,j}, \phi_{k,n}\rangle$ are zero so the linear system is sparse. The inner product $\langle \psi_{i,j}, \phi_{k,n}\rangle$ is nonzero when reflection from the (i,j) pixel affects the light intensity at Sensor k within time interval $[(n-1)T, nT]$. Thus, for a nonzero inner product the (i,j) pixel must intersect the elliptical annulus between $C_k^{(n-1)T}$ and $C_k^{nT}$. With reference to FIG. 3(a), this occurs for a small fraction of (i,j) pairs unless M is small or T is large. The value of a nonzero inner product depends on the fraction of the square pixel that overlaps with the elliptical annulus and the geometric attenuation factor $a_k(x)$.

Figure 4:
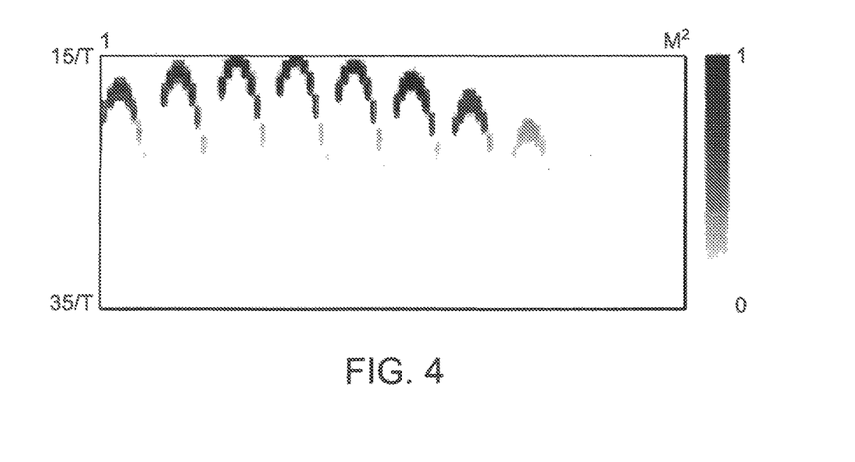
FIG. 4 is an illustration of an example matrix A corresponding to Light Meter 1 for the scene in FIG. 1.

To express (9) with a matrix multiplication, replace double indexes with single indexes (i.e., vectorize, or reshape) as $$y = Ac \quad (10)$$

where $y \in \mathbb{R}^{KN}$ contains the data samples $\{y_k[n]\}$, the first N from Light Meter 1, the next N from Light Meter 2, etc.; and $c \in \mathbb{R}^{M^2}$ contains the coefficients $\{c_{i,j}\}$, varying i first and then j. Then $\langle \psi_{i,j}, \phi_{k,n}\rangle$ appears in row $(k-1)N+n$, column $(j-1)M+i$ of $A \in \mathbb{R}^{KN \times M^2}$. FIG. 4 illustrates an example of the portion of A corresponding to Sensor 1 for the scene in FIG. 1.

Assuming that A has a left inverse (i.e., $\text{rank}(A) = M^2$), one can form an image by solving (10). The portion of A from one sensor cannot have full column rank because of the collapse of information along elliptical annuli depicted in FIG. 3(a). Full rank can be achieved with an adequate number of sensors, noting that sensor positions must differ to increase rank, and greater distance between sensor positions improves conditioning.

Those skilled in the art will appreciate that the rank condition is not necessary for producing a digital image. Any method of approximate solution of (10) could be employed. In the case that non-LTI effects are included, the analogue of (10) may be nonlinear, in which case rank would not apply. The invention applies to any method of approximate solution of the resulting system of equations.

Those skilled in the art will recognize that the discretized linear system (10) is not the only way to process the measurements in (6) to form a digital image. For example, the measurements are a one-dimensional projection of an elliptical Radon transform, and methods such as those in [14,15,16] can be employed.

A Dirac impulse illumination is an abstraction that cannot be realized in practice. One can use expensive, ultrafast optical lasers that achieve Terahertz bandwidth as an approximation to impulsive illumination, as in [1]. The present invention allows practical, non-impulsive illuminations to improve upon impulsive illumination for typical scenes and sensors.

Figure 5:
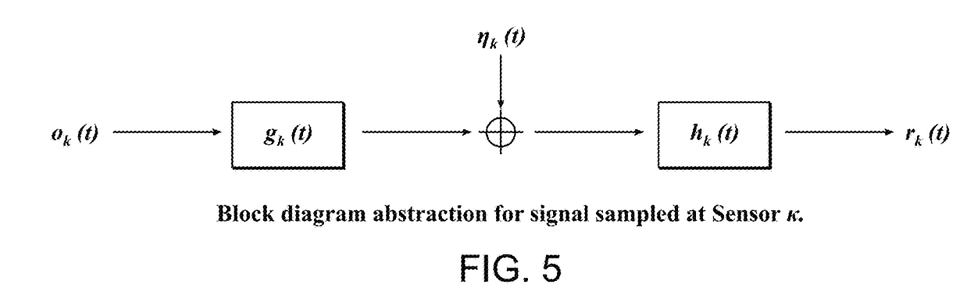
FIG. 5 is a block diagram abstraction for a signal sampled at Light Meter k.

Light transport is linear and time invariant. Hence, the effect of a general illumination intensity waveform $s(t)$ is the superposition of effects of constant illuminations over infinitesimal intervals. This superposition changes the light incident at Light Meter k from $g_k(t)$ in (2) to $g_k(t)*s(t)$. Thus, the block diagram in FIG. 5 represents the signal at Light Meter k, including its sampling prefilter and photodetector noise represented by $\eta_k(t)$. Except at very low flux, $\eta_k(t)$ is modeled well as signal-independent, zero-mean, white and Gaussian; those skilled in the art can incorporate other noise models. The noise variance $\sigma^2$ depends on the device physics and assembly; our later simulations use $\sigma=0.1$, which the reader can compare to plots of simulated received signals.

Figure 6A:
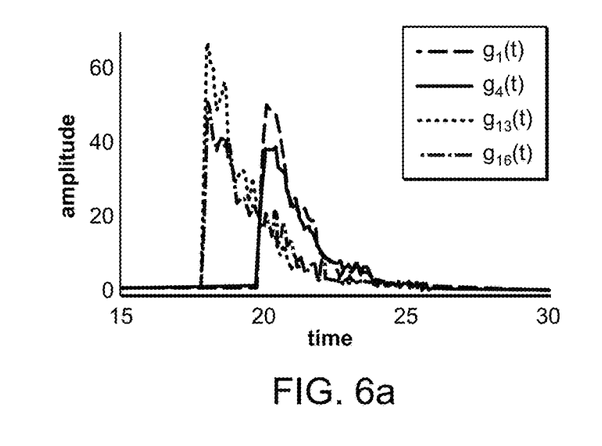
FIG. 6a is a graph of amplitude against time showing responses to impulsive illumination in FIG. 1.

A typical natural scene $f$ has a good bandlimited approximation. Integration over elliptical contours $C_k^t$ further smooths the signal. Plotted in FIG. 6(a) are continuous-time responses $g_k(t)$ corresponding to FIG. 1. Since these have sharp decay with frequency, s(t) is best chosen to be lowpass to put signal energy at frequencies most present in $g_k(t)$.

In [1], high-bandwidth illumination and sampling were used under the assumption that these would lead to the highest reconstruction quality. However, impulsive illumination severely limits the illumination energy, leading to poor SNR, especially due to the radial fall-off attenuations in (1).

Here we compare impulsive and lowpass illumination. All image reconstructions are obtained with (10) regularized by the $l^2$ norm of the discrete Laplacian, with regularization parameter optimized for $l^2$ error. This conventional technique for backprojection [9] mildly promotes smoothness of the reconstruction; additional prior information, such as sparsity with suitable $\{\psi_{i,j}\}$, is beneficial but would obscure the novelty of the invention. Results are for M=50 and several values of sampling period T and sensor array extent W.

Figure 7:
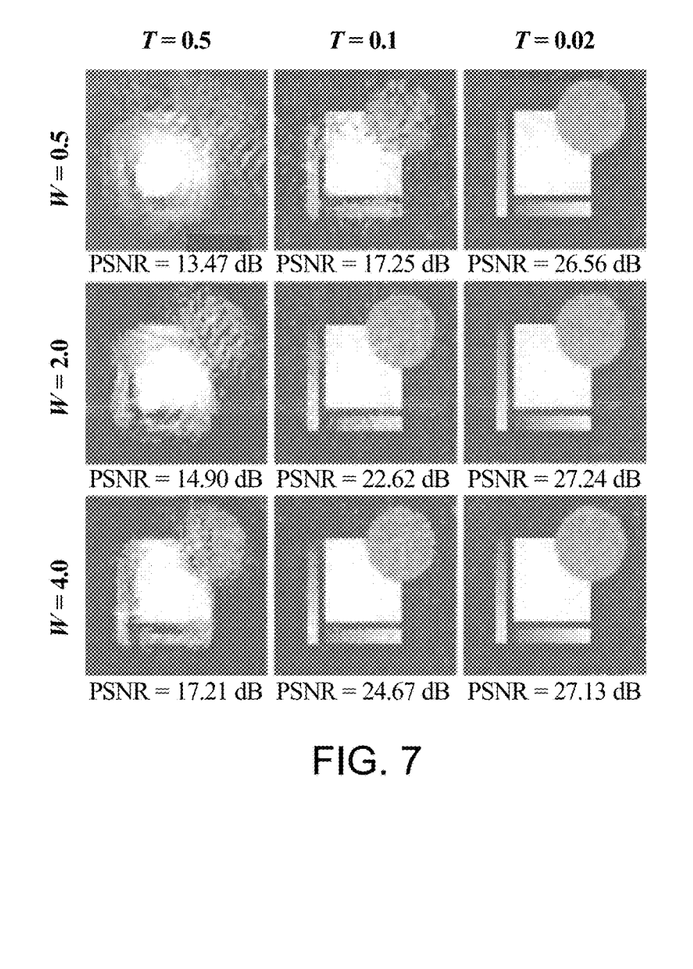
FIG. 7 are reconstructions of a scene obtained with impulsive illumination and the 4-by-4 array of light meters shown in FIG. 1.

In direct analogy with [1], we simulated short-pulsed, high-bandwidth illumination using a square-wave source with unit amplitude and time width equal to one-fifth of T. FIG. 7 shows the results. Reconstruction with good spatial resolution is indeed possible, and the conditioning improves as W increases and as T decreases.

Figure 6B:
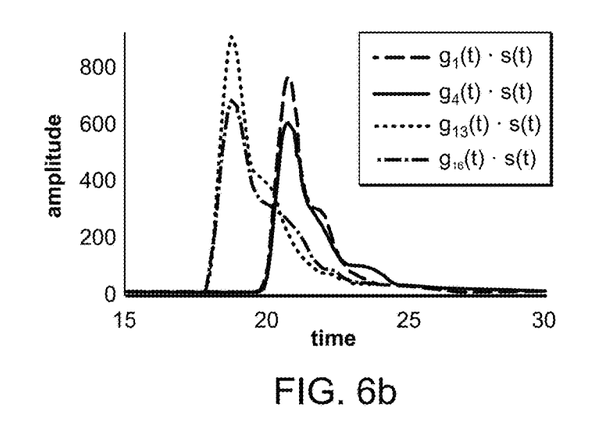
FIG. 6b is another graph of amplitude against time showing continuous time responses.
Figure 8:
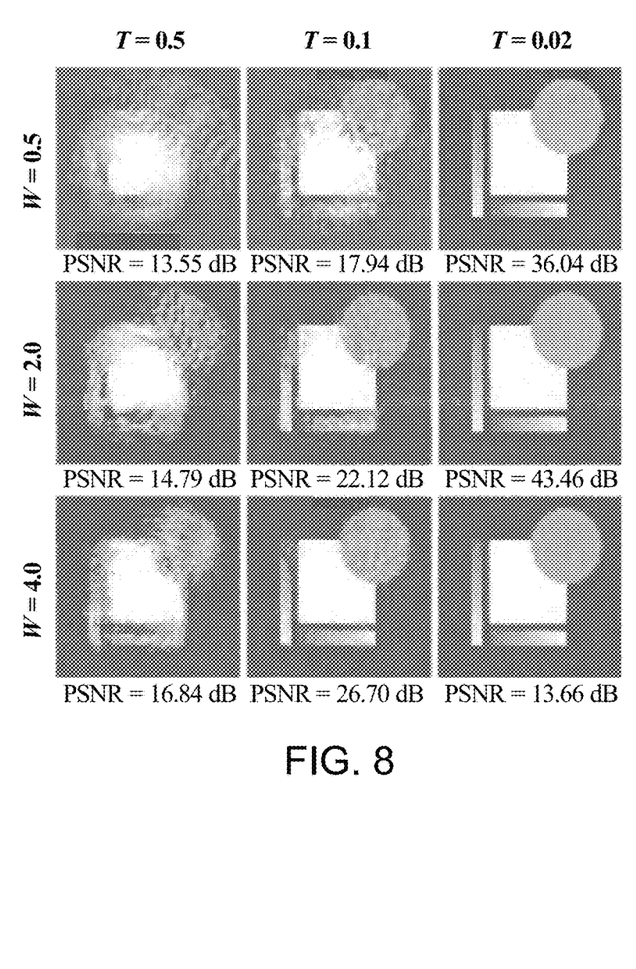
FIG. 8 are reconstructions obtained with lowpass illumination and the 4-by-4 array of light meters shown in FIG. 1.

Using non-impulsive, low-bandwidth illumination, we show that high SNR can be achieved while improving the reconstruction resolution. We chose s(t) to be the truncated impulse response of a third-order Butterworth filter, with again a unit peak amplitude. As illustrated in FIG. 6(b), this choice of s(t) produces a much stronger scene reflection and hence improves the SNR at the detector. Note that the critical lowpass portion of $g_k(t)$ is preserved and furthermore amplified. FIG. 8 shows the resulting improvements in reconstructed images; we can infer that the improvement in SNR is coming without excessive loss of matrix conditioning. Hence, the choice of a non-impulsive illumination is not only practical but demonstrably better in terms of image reconstruction quality.

The proof-of-concept experiments in [1] show that diffuse imaging can succeed in forming image reconstructions. In this patent application we have used signal processing abstractions to show that using lowpass time-varying illumination instead of impulsive sources improves the SNR and reconstruction quality.

Assigning dimensions to our simulation enables the specification of required device capabilities for one instantiation of the exemplary configuration. Suppose the 50-by-50 pixel image reconstruction with W=4 and T=0.1 shown in FIG. 8 corresponds to a physical planar scene of edge length 15 m imaged from 10 m away using an array with 4 m extent. Then the illumination bandwidth is about 375 MHz and the sensor sampling frequency is about 750 MHz. The total energy output of the source is about 44 mJ. Compared to the 40 THz bandwidth laser (10.5 nJ per pulse) and 500 GHz streak camera used in [1], our simulations show that diffuse imaging can be implemented with practical opto-electronic hardware used in optical communications.

The numbers in brackets refer to the references listed herein. The contents of all of these references are incorporated herein by reference as is the provisional application to which this application claims priority.

It is recognized that modifications and variations of the present invention will be apparent to those of skill in the art—including but not limited to the variations mentioned in the description of the exemplary configuration—and it is intended that all such modifications and variations be included within the scope of the appended claims.

REFERENCES

[1] A. Kirmani, A. Velten, T. Hutchison, M. E. Lawson, V. K. Goyal, M. Bawendi, and R. Raskar, "Reconstructing an image on a hidden plane using ultrafast imaging of diffuse reflections," May 2011.

[2] H. E. Edgerton and J. R. Killian, Jr., *Flash! Seeing the Unseen by Ultra High-Speed Photography*. Boston, Mass.: Hale, Cushman and Flint, 1939.

[3] B. Schwarz, "LIDAR: Mapping the world in 3D," *Nature Photonics*, vol. 4, no. 7, pp. 429-430, July 2010.

[4] S. Foix, G. Alenyà, and C. Torras, "Lock-in time-of-flight (ToF) cameras: A survey," *IEEE Sensors J.*, voL 11, no. 9, pp. 1917-1926, September 2011.

[5] P. Sen, B. Chen, G. Garg, S. R. Marschner, M. Horowitz, M. Levoy, and H. P. A. Lensch, "Dual photography," *ACM Trans. Graphics*, vol. 24, no. 3, pp. 745-755, July 2005.

[6] A. Kirmani, T. Hutchison, J. Davis, and R. Raskar, "Looking around the corner using transient imaging," in *Proc. IEEE 12th Int. Conf. on Computer Vision*, Kyoto, Japan, September-October 2009.

[7] M. Oren and S. K. Nayar, "Generalization of the Lambertian model and implications for machine vision," *Int. J. Comput. Vis.*, vol. 14, no. 3, pp. 227-251, April 1995.

[8] M. Unser, "Sampling—50 years after Shannon," *Proc. IEEE*, vol. 88, no. 4, pp. 569-587, April 2000.

[9] M. Elad and A. Feuer, "Restoration of a single super-resolution image from several blurred, noisy and undersampled measured images," *IEEE Trans. Image Process.*, vol. 6, no. 12, pp. 1646-1658, December 1997.

[10] P. Sen and S. Darabi, "Compressive dual photography," *Computer Graphics Forum*, vol. 28 no. 2, pp. 609-618, April 2009.

[11] P. K. Baheti and M. A. Neifeld, "Feature-specific structured imaging," *Applied Optics*, vol. 45, no. 28, pp. 7382-7391, October 2006.

[12] D. Takhar, J. N. Laska, M. B. Wakin, M. F. Duarte, D. Baron, S. Sarvotham, K. F. Kelly, and R. G. Baraniuk, "A new compressive imaging camera architecture using optical-domain compression," in *Computational Imaging IV*, C. A. Bowman, E. L. Miller, and I. Pollak, eds., Proc. SPIE vol. 6065, 2006.

[13] B. I. Erkmen and J. H. Shapiro, "Ghost imaging: from quantum to classical to computational," *Advances in Optics and Photonics*, vol. 2, no. 4, pp. 405-450.

[14] J. D. Coker, A. H. Tewfik, "Multistatic SAR image reconstruction based on an elliptical-geometry Radon transform," in *International Waveform Diversity and Design Conference* 2007, pp. 204-208.

[15] R. Gouia, "Some problems of integral geometry in advanced imaging," doctoral dissertation, University of Texas-Arlington, 2011.

[16] R. Gouia-Zarrad and G. Ambartsoumian, "Approximate inversion algorithm of the elliptical Radon transform," in $8^{th}$ *International Symposium on Mechatronics and Its Applications*, pp. 1-4, 2012.

What is claimed is:

1. A system comprising:
a non-impulsive, low bandwidth of approximately 350 MHz source of scene illumination with intensity varying in time and some spatial intensity characteristic;
a time-resolved light meter to generate time-resolved samples at a sampling frequency of approximately 750 MHz of intensity of light incident on the time-resolved light meter, reflected from the scene, with some spatial sensitivity characteristic; and
a computer means to process the time-resolved light meter samples to form a digital image of the scene for a plurality of combinations of illumination spatial intensity characteristics and light meter spatial sensitivity characteristics.

2. The system of claim 1 wherein a plurality of light meter spatial sensitivity characteristics is obtained with a plurality of light meters, a plurality of positions of a light meter, or a plurality of states on a spatial light modulator.

3. The system of claim 2 wherein the light meters are arranged in a regular array.

4. The system of claim 1 wherein a plurality of illumination spatial intensity characteristics is obtained with a plurality of light sources, a plurality of positions of a light source, or a plurality of states on a spatial light modulator.

5. The system of claim 1 wherein the scene comprises a Lambertian surface.

6. The system of claim 1 wherein the spatial support of an illumination spatial intensity characteristic is greater than the spatial resolution of the digital image.

7. The system of claim 1 wherein the spatial support of a light meter spatial sensitivity characteristic is greater than the spatial resolution of the digital image.

8. The system of claim 1 wherein the light intensity variation is chosen to enhance the accuracy of the digital image.

* * * * *